July 3, 1928.
P. LA F. MAGILL ET AL
1,675,366
MANUFACTURE OF HYDROCYANIC ACID FROM FORMAMIDE
Filed Jan. 14, 1927   2 Sheets-Sheet 1
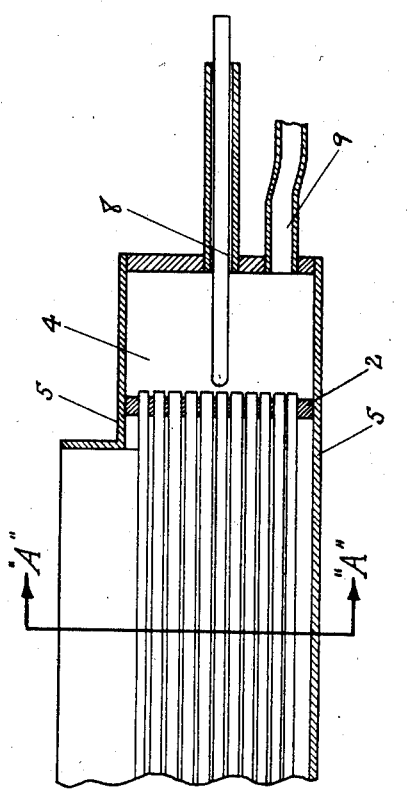
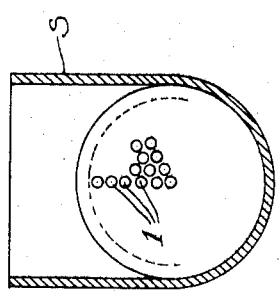
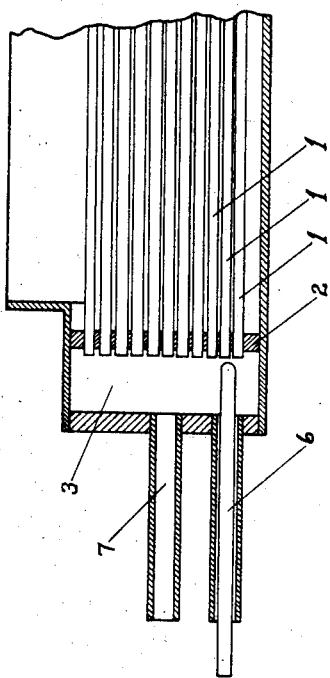
Paul LaTrone Magill INVENTORS
Paul Johnson Carlisle,
BY J.C. Wooster
ATTORNEY July 3, 1928.
P. LA F. MAGILL ET AL
1,675,366
MANUFACTURE OF HYDROCYANIC ACID FROM FORMAMIDE
Filed Jan. 14, 1927   2 Sheets-Sheet 2
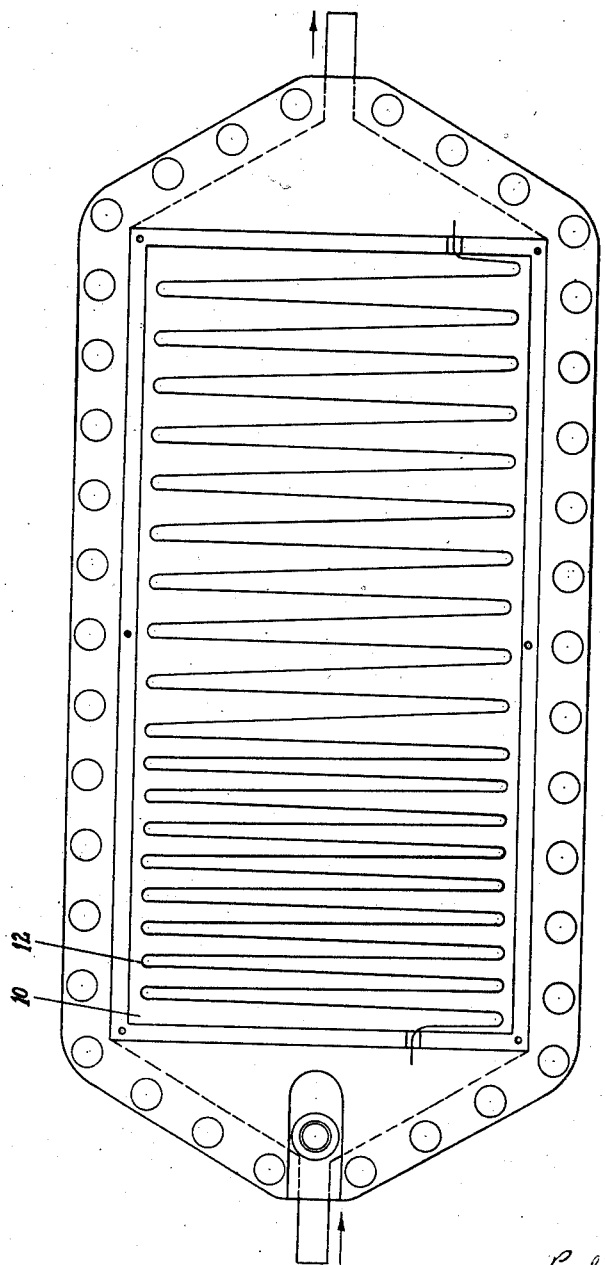
FIG. III
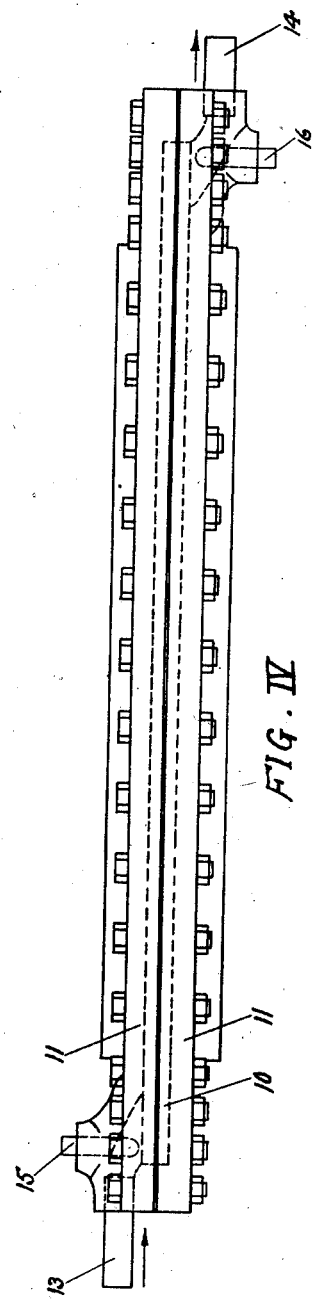
FIG. IV
Paul Lavrone Magill INVENTORS.
Paul Johnson Carlisle,
BY J. O. Wooster,
ATTORNEY Patented July 3, 1928.

1,675,366

UNITED STATES PATENT OFFICE.

PAUL LA FRONE MAGILL AND PAUL JOHNSON CARLISLE, OF NIAGARA FALLS, NEW YORK, ASSIGNORS TO THE ROESSLER & HASSLACHER CHEMICAL CO., OF NEW YORK, N. Y., A CORPORATION OF NEW YORK.

MANUFACTURE OF HYDROCYANIC ACID FROM FORMAMIDE.

Application filed January 14, 1927. Serial No. 161,054.

This invention relates to a new and useful improvement in the manufacture of hydrocyanic acid from formamide by catalytic decomposition.

It is known that formamide vapor when heated alone or in contact with porcelain, copper gauze, iron wire or charcoal, decomposes to give hydrocyanic acid and water. This process has, however, not been put into commercial use because of the large losses of hydrocyanic acid occurring from secondary reactions such as:

$$HCN + H_2O \rightarrow NH_3 + CO$$

We have now discovered that these losses, and the loss occasioned by the direct decomposition of formamide to ammonia and carbon monoxide are due in the main to difficulties of heat supply and temperature control. This difficulty is due to the highly endothermic nature of the reaction:

$$HCONH_2 + 29{,}000 \text{ calories} \rightarrow HCN + H_2O$$

In this reaction it is necessary to supply the large amount of heat evenly so as to avoid any excessive overheating or undue length of exposure of the mixture of formamide, hydrocyanic acid and water vapors to the reaction temperature.

We have found that suitable control can be secured if the streams of formamide vapor are reduced to a small size in narrow reaction or catalyst chambers. These streams should be of such size that no portion of the formamide vapor will be more than one half inch from a temperature sustaining medium. The chambers may be packed with a solid nonporous catalyst preferably of high heat conductivity. We have found that brass is an especially valuable catalyst for the reaction. We have also found that copper may be used, but it does not retain its efficiency and activity for as long a period as when it is alloyed with zinc. The percentage of zinc in the alloy may vary from 20% up to 50% and we do not wish to be limited to any definite composition. We have preferably utilized a brass containing about 34% zinc. The couper-zinc alloy may of course be used in a variety of forms, viz, as wire or wire cloth, granular or globular particles or as a solid coating on the chamber walls. We have also employed phosphor bronze, silver, aluminum and Monel metal in chamber construction or as catalysts in a variety of forms. Porous catalysts are objectionable since vapor collection takes place resulting in increased exposure time and overheating.

In accordance with our discoveries we preferably utilize as a decomposition chamber a vessel having brass walls and so constructed that at no point will the formamide vapors undergoing decomposition be more than one half inch from the chamber walls.

This result is secured, for example, by constructing a reaction vessel consisting of a bundle of brass tubes one inch or less in diameter and passing the formamide vapor through these tubes while supplying heat to their exteriors. Other forms of narrow chambers may be used. For example, an annular chamber may be formed of two concentric brass tubes heated by any suitable means applied to either the outer or inner tube or both, dependent on the thickness of the annular space.

Figure I shows a converter constructed of tubes one inch or less in diameter; Figure II is section at A—A of Figure I; while Figures III and IV show top and edge views, respectively, of a slot shaped or rectangular single chamber converter.

In Figures I and II the tubes 1 are set in headers 2 so as to communicate with an entrance chamber 3 and an exit chamber 4. The containing shell 5 is here shown open at the top for use with a molten bath heat distributing means. The molten bath is heated by circulating through a heater external to the converter or direct heat may be applied to the bottom of the shell 5. The entrance chamber 3 is provided with a temperature indicating means 6 and a gas inlet 7; the exit chamber 4 is likewise provided with a temperature indicator 8 and has a gas exit 9. Formamide vapor is passed in at 7 and flows into the tubes 1 where it is decomposed; hydrocyanic acid gas and other reaction products flow out at 9.

In Figures III and IV a slot or rectangular space 10 is formed by coincident depressions in two brass plates 11; a chamber of this structure has been used which was approximately 6½ inches wide, 12½ inches long and ⅜ inch deep. Any depth less than 1 inch is suitable. Electric resistance wires 12 on each external side of the plates 11 are used for heating. Gas entrance and exit are at 13 and 14; 15 and 16 are thermoelements for gas temperature control. This type of chamber is adaptable for use empty or it may be packed with a solid non-porous catalyst.

The optimum reaction temperature is above 300° C.; we have obtained the best results between 450° C. and 650° C. The heating may be accomplished by hot gases, direct burning gases, electric heating or fused baths. The vaporization of the formamide before passing into the converter should be as rapid as possible after heat has been applied to the liquid and the vapors then should be passed through the reaction chamber as quickly thereafter as possible so as to avoid long continued heating of the formamide. The formamide vapors should not have a temperature over 300° C. and preferably about 260° C. before entering the converter since continued heating at elevated temperatures will result in undesirable products.

The rate of formamide vapor flow, i. e. the space velocity, will depend on the shape of the converter space and the temperature. This rate will be high in order to avoid decomposition, but we prefer not to limit ourselves in this regard since a great leeway is possible.

The following examples will illustrate some of our applications of this invention:

I. Slot shaped brass chamber of dimensions given above and run empty. With a chamber temperature of 520° C. to 590° C. and a space velocity of 226 a yield of 90% HCN was obtained based on the formamide passed in.

II. An annular chamber formed of a 2 inch brass tube having a 1½ inch brass core was packed with a brass gauze and externally heated to 500° C. Formamide vapor was passed through the chamber at a space velocity of 200 and gave a yield of 92% HCN.

III. A tubular brass chamber 6 inches long and 29/32 inch diameter was heated to 560° C. to 600° C. and used empty as a reaction chamber. With a space velocity of 240 a 90% yield of HCN was obtained from the formamide passed in.

Claims:

1. Process for the production of hydrocyanic acid from formamide which comprises passing formamide vapor in contact with brass at a temperature above 300° C.

2. Process for the production of hydrocyanic acid from formamide which comprises passing formamide vapor in contact with brass at a temperature between 450° C. and 650° C.

3. Process for the production of hydrocyanic acid from formamide which comprises passing formamide vapor through a narrow reaction space the walls of which contain a material catalytic to the reaction heated to a temperature above 300° C.

4. Process for the production of hydrocyanic acid from formamide which comprises passing formamide vapor through a narrow reaction space formed of a metal catalytic to the reaction and heated to a temperature above 300° C.

5. Process for the production of hydrocyanic acid from formamide which comprises passing formamide vapor through a narrow reaction space formed of a metal catalytic to the reaction and heated to a temperature between 450° C. and 650° C.

6. Process for the production of hydrocyanic acid from formamide which comprises passing formamide through a reaction space maintained at a temperature above 300° C. by means of heat applied to the external walls, said reaction space being of such dimensions that no portion of said formamide vapor will be at a greater distance than one half of an inch from a surface supplying heat to the reaction.

7. Process for the production of hydrocyanic acid from formamide which comprises passing formamide through a reaction space maintained at a temperature between 450° C. and 600° C. by means of heat applied to the external walls, said reaction space being of such dimensions that no portion of said formamide vapor will be at a greater distance than one half of an inch from a surface supplying heat to the reaction.

8. Process for the production of hydrocyanic acid from formamide which comprises passing formamide vapor through a narrow reaction space the walls of which contain brass and are heated to a temperature above 300° C.

9. Process for the production of hydrocyanic acid from formamide which comprises passing formamide vapor through a narrow reaction space the walls of which are formed of brass and are heated to a temperature above 300° C.

10. Process for the production of hydrocyanic acid from formamide which comprises passing formamide vapor through a narrow reaction space the walls of which are formed of brass and are heated to a temperature between 450° C. and 650° C.

11. Process for the production of hydrocyanic acid from formamide which comprises passing formamide through a brass walled reaction space maintained at a temperature above 300° C. by means of heat applied to the external walls, said reaction space being of such dimensions that no portion of said formamide vapor will be at a greater distance than one half of an inch from a surface supplying heat to the reaction.

12. Process for the production of hydrocyanic acid from formamide which comprises passing formamide through a brass walled reaction space maintained at a temperature between 450° C. and 650° C. by means of heat applied to the external walls, said reaction space being of such dimensions that no portion of said formamide vapor will be at a greater distance than one half of an inch from a surface supplying heat to the reaction.

Signed at Niagara Falls in the county of Niagara and State of New York this 10th day of January, A. D. 1927.

PAUL LA FRONE MAGILL.
PAUL JOHNSON CARLISLE.